United States Patent [19]

Ducza et al.

[11] Patent Number: 4,528,932

[45] Date of Patent: Jul. 16, 1985

[54] IRON CORE FOR THE MAGNETIC INDUCTION OF A VISUAL INFORMATION DISPLAYING ELEMENT WITH A MAGNETIC TILTING PLATE

[75] Inventors: Lajos Ducza; László Jagicza; László Jáki; Sándor Jodál; József Mandzsu; Gábor Sümegi, all of Budapest, Hungary

[73] Assignee: "FOK-GYEM" Finommechanikai és Elektronikus Mûszergyártó Szovetkezet, Budapest, Hungary

[21] Appl. No.: 499,513

[22] Filed: May 31, 1983

[30] Foreign Application Priority Data

Jul. 15, 1982 [HU] Hungary .............................. 2294/82

[51] Int. Cl.3 .......................... G01D 5/20; G08B 5/24

[52] U.S. Cl. ...................................... 116/204; 40/449; 340/815.20; 340/815.26

[58] Field of Search .......................... 116/204; 40/449; 340/815.26, 815.29, 815.04, 815.05, 815.20

[56] References Cited

U.S. PATENT DOCUMENTS

| | | | |
|---|---|---|---|
| 3,295,238 | 1/1967 | Winrow | 40/449 |
| 3,365,824 | 1/1968 | Winrow | 40/449 |
| 3,518,664 | 6/1970 | Taylor | 340/815.26 |
| 3,624,941 | 12/1969 | Chantry | 40/449 |
| 3,916,403 | 10/1975 | Mandzsu et al. | 40/449 X |
| 3,991,496 | 11/1976 | Helwig et al. | 40/449 |
| 4,156,872 | 5/1979 | Helwig | 116/204 X |

*Primary Examiner*—Daniel M. Yasich
*Attorney, Agent, or Firm*—Young & Thompson

[57] ABSTRACT

An iron core for the magnetic induction of a visual information displaying element with a magnetic flip plate, wherein the display element comprises one or more permanent-magnetic flip plates magnetized perpendicular to their face and suitable for the direct or indirect display of the informàtion. It is provided with one or more exciting coils with an iron core with a repolarizable remanent induction adapted to produce a magnetic field and with a coercive force less than the coercive force of the permanent magnet in the flip plate. On the end of the core facing the display element a profiled body is closely fitted, which is made of a magnetic material having a higher initial permeability than the initial permeability of the iron core and which is provided with a profiled cut-out corresponding to the cross-section of the end of the iron core.

4 Claims, 4 Drawing Figures

Figure 1:
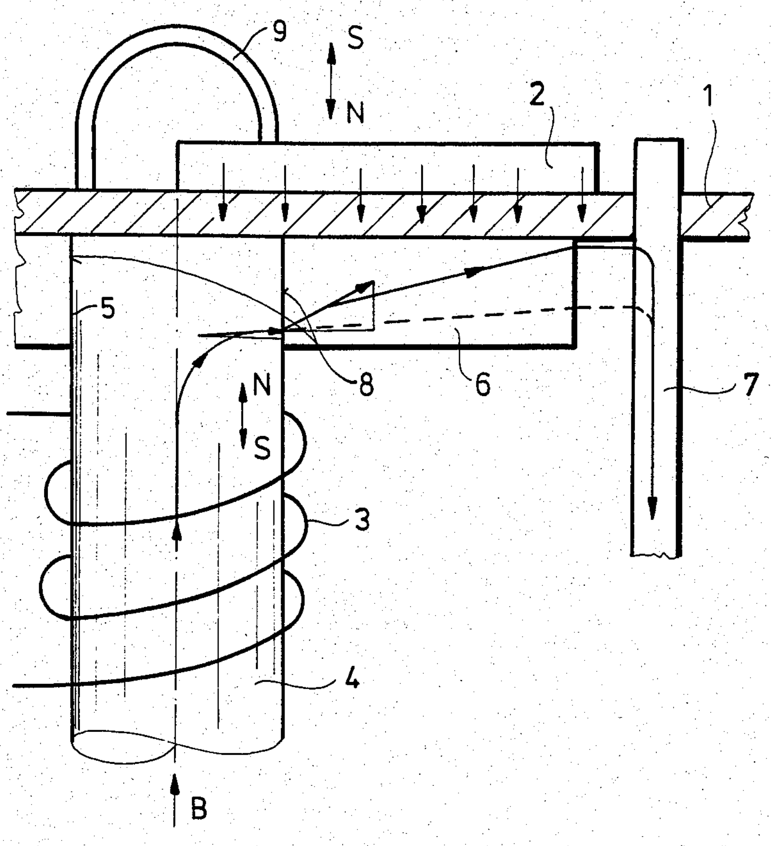

IRON CORE FOR THE MAGNETIC INDUCTION OF A VISUAL INFORMATION DISPLAYING ELEMENT WITH A MAGNETIC TILTING PLATE

The invention relates to an iron core for the magnetic induction of a visual information displaying element with a magnetic plate that flips over; the display element contains one or more permanent-magnetic flip plates that have been magnetized perpendicularly to its face and are suitable for the direct or indirect display of the information. Furthermore, it is provided with one or more exciting coils with an iron core made of a permanent magnet with a repolarizable remanent induction suitable for producing a magnetic field and with a coercive force which is less than the coercive force of the permanent magnet(s) in the flip plate(s).

A magnetic display element for the display of visual information is known, in which the iron cores of the bipolar excited electromagnets driving the displaying elements are made—partly or entirely—of a permanent magnetic material. The coercive force of the permanent magnet forming the iron core is less than the coercive force of the permanent magnet of the tilting plate, while field-force obtained by the remanent induction of the permanent magnet of the flip plate is less than the field-force needed for magnetizing the iron core of the electromagnet in an assembled state. Such a display element is discribed e.g. in U.S. Pat. No. 3,916,403.

The solution described therein enables a display with a far higher speed, than the earlier solutions with the flip plate. The deficiency, however, lies in that in the assembled state of the displaying elements the ends of the iron cores protruding from the coil deflect during the period of induction the magnetic force lines from the flip plates due to closure with the screening plates and one with another. As a consequence, the tangential or effective component of the magnetic induction arising during the period of excitation cannot be optimally utilized.

The aim of the invention is to achieve the optimal utilization of the effective tangential component of the magnetic inductivity arising during the period of excitation for the display of the information, whereby the stable operation of the displaying element can be assured with the simultaneous reduction of the previously consumed energy.

The invention is based on the recognition that if the iron core of the exciting coil of the displaying element with the magnetic flip plate is formed so that onto the end of the iron core of the magnet facing the displaying element a disc or any other profiled body is closely fitted, which is made of a magnetic material having a higher initial permeability than the initial permeability of the iron core and which is provided with a bore or gap corresponding to the cross-section of the iron core, on the matching surface lying perpendicular to the plane of display, then thanks to the refraction of the magnetic field-characteristics, under the influence of the magnetic inductivity with a larger tangential component, even during the time of excitation the flipping of the flip plates in accordance with the information and maintenance in the adjusted position become stable even with a smaller consumption of the exciting energy.

The essence of the invention lies in that on the end(s) of the permanent-magnetic core facing the displaying element a profiled body is arranged with a close fit on the permanent-magnetic core, which is made of a different magnetic material with an initial permeability that is larger, than the initial permeability of the permanent-magnetic core, and which is provided with a profiled cut-out corresponding to the cross-section of the end(s) of the permanent-magnetic core.

Figure 2:
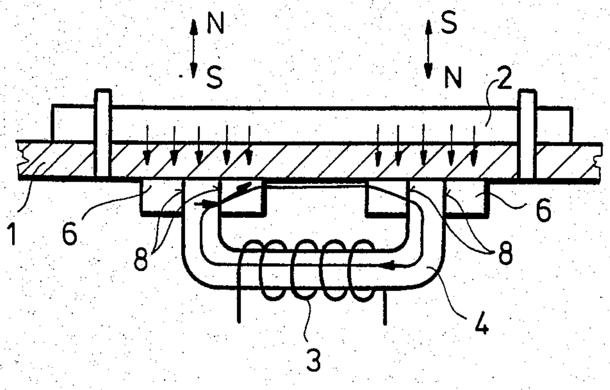
Figure 3:
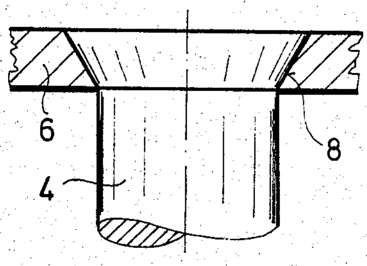
Figure 4:
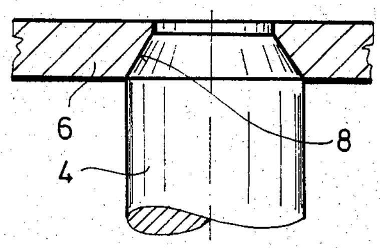

The invention will be described in detail by means of preferred embodiments, by the aid of the accompanying drawings, wherein:

FIG. 1 is the schematical illustration of one of the embodiments of the iron core according to the invention, FIG. 2 shows another preferred embodiment, in which on both ends of the permanent-magnetic core is a profiled body, FIG. 3 illustrates a further embodiment with a hard-magnetic core with a conical tip, FIG. 4 shows the combination of the cylindrical and conical tips of the hard-magnetic core.

As seen in FIGS. 1–2, on the base plate 1 a magnetic flip plate 2 is supported in bearings, and the flip plate 2 is magnetized perpendicularly to the base plate 1. Behind the base plate 1 a core 4 made of a permanent magnet and provided with an exciting coil 3 is disposed. On the end of the core 4 facing the flip plate 2 there is a body 6, which is provided with a cut-out 5. If core 4 is a cylindrical body with a circular cross-section, the body 6 is shaped as a disc, in which the cut-out 5 is a bore, to be pushed onto the core 4 with a close fit. The individual displaying elements are separated by means of the screening plates 7.

The body 6 is also made of a magnetic material, however, of a magnetic material having a larger permeability than the permeability of the core 4. In case of the previously mentioned solution with the cylindrical shape the magnetic induction B at the confining wall 8 between the core 4 and the body 6 encloses an acute angle with the tangent-planes of the confining wall 8. In accordance with the magnetic field characteristics, if the magnetic force lines pass from a magnetic body with a lower permeability into a magnetic body with a higher permeability, they enclose with the normal to a given point of the confining surface an acute angle, i.e. at the boundary surface of the two magnetic materials refraction takes place. In accordance with the magnetic field-characteristics in the magnet with the higher initial permeability the magnitude of the component perpendicular to the boundary surface is the same, as in the magnetic body before the boundary surface, while the tangential component varies in accordance with the quotient of the permeabilities.

That means that upon excitation the induction component perpendicular to the cylindrical surface with an axis perpendicular to the boundary surface 8, in this example to the base plate 1, does not change. Otherwise, this component is not effective at all from the point of view of operation; as it is perpendicular to the magnetic field of the flip plate.

Flipping over of the flip plate in known manner on member 9 is assured by the increased tangential component. This component being effective from the point of view of operation, promotes far better flipping due to its increment, also the stopping after flipping becomes more stable.

If if on the core 4 the exciting coil 3 is arranged parallel to the base plate, and both ends of the core 4 are directed towards the base plate 1, on both ends of the core 4 there is a provided body 6 (FIG. 2).

The end of the core 4 can be built up of conical parts (FIG. 3) or of conical and cylindrical parts (FIG. 4). The core may have a triangular, rectangular or polygonal cross-section.

The iron core according to the invention has the following advantages:

the form can be omitted, since the profiled body can be used as the side wall of the form;

die-casting of the iron core into the base plate becomes superfluous;

the flip plate and the exciting coil can be separately installed;

due to the omission of the form the coil can be wound to a smaller diameter with the same number of turns, i.e. the length of the wire may be reduced;

not only during excitation, but also in the state after excitation the influence of the increased tangential component of induction is larger, accordingly energy of excitation can be reduced.

It goes without saying, that the invention is not restricted to the embodiments described and serving as examples but rather includes all the possibilities according to the claims.

What we claim:

1. In an iron core for the magnetic induction of a visual information display element with a flip plate on at least one bearing on one side of a base plate, comprising a permanent magnet magnetized perpendicular to the plate and at least one exciting coil with an iron core with a repolarizable remanent induction and with a coercive force less than the coercive force of the permanent magnet of the tilting plate; the improvement comprising a body of a predetermined size provided on the other side of said base plate and having a cutout for the end of the core facing the display element, said body being made of a magnetic material having a higher initial permeability than the initial permeability of the iron core, and the cut-out in the body corresponding to the cross-section of the end of the iron core, said end of said iron core being closely fitted in said cut-out.

2. Iron core as claimed in claim 1, in which the end of the core, as well as the confining wall of the cut-out of the body are perpendicular to the plane of display in an assembled state.

3. Iron core as claimed in claim 2, in which the core has a cylindrical shape and the cut-out of the body is a bore and the diameter thereof corresponds to the cylindrical end of the core.

4. Iron core as claimed in claim 1, in which the greatest dimension of the profiled body normal to the flipping axis is twice the greatest distance between the permanent magnet of the flip plate and the flipping axis.

* * * * *